(12) United States Patent
Oda

(10) Patent No.: US 11,355,919 B2
(45) Date of Patent: Jun. 7, 2022

(54) CURRENT DIFFERENTIAL RELAY APPARATUS

(71) Applicant: Mitsubishi Electric Corporation, Tokyo (JP)

(72) Inventor: Shigetoo Oda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/143,278

(22) Filed: Jan. 7, 2021

(65) Prior Publication Data

US 2021/0273443 A1 Sep. 2, 2021

(30) Foreign Application Priority Data

Mar. 2, 2020 (JP) .............................. JP2020-034835

(51) Int. Cl.
*H02H 3/30* (2006.01)
*H02H 1/00* (2006.01)

(52) U.S. Cl.
CPC .......... *H02H 3/305* (2013.01); *H02H 1/0007* (2013.01); *H02H 1/0092* (2013.01)

(58) Field of Classification Search
CPC ..... H02H 3/305; H02H 1/0007; H02H 1/0092
See application file for complete search history.

(56) References Cited

U.S. PATENT DOCUMENTS

| | | | | |
|---|---|---|---|---|
| 4,477,854 A | * | 10/1984 | Usui ..................... | H02H 7/045 361/87 |
| 5,796,630 A | * | 8/1998 | Maeda .................... | H02H 3/40 361/160 |
| 2013/0120888 A1 | * | 5/2013 | Kase ..................... | H02H 3/283 361/63 |
| 2014/0307758 A1 | * | 10/2014 | Kase ..................... | H02H 7/263 375/211 |
| 2017/0104324 A1 | * | 4/2017 | Schweitzer, III ...... | H02H 7/265 |

FOREIGN PATENT DOCUMENTS

| | | | |
|---|---|---|---|
| JP | 08168165 A | * | 6/1996 |
| JP | 2000224755 A | | 8/2000 |
| JP | 2016144297 A | * | 8/2016 |

* cited by examiner

*Primary Examiner* — Scott Bauer
(74) *Attorney, Agent, or Firm* — Buchanan Ingersoll & Rooney PC

(57) ABSTRACT

A current differential relay apparatus includes a first relay and a second relay. The first relay calculates a first differential current and a first suppression current, using a first current and a second current, and performs a ratio differential relay operation based on the first differential current and the first suppression current. The second relay calculates a maximum of results of add operations of the first current and the second current as a second differential current, calculates an add operation of the maximum of the first current and a maximum of the second current as a second suppression current, and performs a ratio differential relay operation based on the second differential current and the second suppression current. The current differential relay apparatus includes an output controller that outputs an operation signal based on results of operations performed by the first and second relays.

11 Claims, 12 Drawing Sheets

CURRENT DIFFERENTIAL RELAY APPARATUS

BACKGROUND OF THE INVENTION

Field of the Invention

The present disclosure relates to a current differential relay apparatus.

Description of the Background Art

Conventionally, a current differential relay apparatus is known, which protects equipment included in a power system. The current differential relay apparatus detects occurrence of an internal failure of the equipment to be protected, using a current on the own end side of the equipment to be protected (e.g., a power transmission line) and a current on the other end side of the equipment to be protected.

For example, Japanese Patent Laying-Open No. 2000-224755 discloses a current differential relay apparatus. The apparatus detects the maximum of amounts of suppression in the past n samplings, calculates a current sensitivity of large current region characteristics depending on the magnitude of the amount of suppression to determine the operation of the current differential relay apparatus, using an amount of operation and the maximum of amounts of suppression.

In order to stabilize the power system by reducing a failure duration in the power system as short as possible, a high-speed operation of the current differential relay apparatus is desired. The current differential relay apparatus according to Japanese Patent Laying-Open No. 2000-224755, while it considers preventing a malfunction when an external failure occurs with a large amount of residual magnetic flux remaining and a fault current is caused in a relatively small region by CT saturation, fails to speeding up the operating time.

SUMMARY OF THE INVENTION

An object of the present disclosure according to a certain aspect is to provide a current differential relay apparatus which can operate at a high speed in the event of an internal failure.

A current differential relay apparatus according to a certain embodiment includes a first relay and a second relay that perform a relay operation, using a first current on a first side of equipment to be protected and a second current on a second side of the equipment to be protected. The first relay: calculates a first differential current and a first suppression current, using the first current and the second current; and performs a ratio differential relay operation based on the first differential current and the first suppression current. The second relay: performs an add operation of the first current and the second current, and calculates a maximum of absolute values of results of add operations in a reference period as a second differential current; performs an add operation of a maximum of absolute values of the first current in the reference period and a maximum of absolute values of the second current in the reference period to calculate a result of the add operation as a second suppression current; and performs a ratio differential relay operation based on the second differential current and the second suppression current. The current differential relay apparatus, further includes an output controller which outputs an operation signal for protecting the equipment to be protected, based on a result of operation performed by the first relay and a result of operation performed by the second relay.

A current differential relay apparatus according to other embodiment includes a first relay and a third relay that perform a relay operation using a first current on a first side of equipment to be protected and a second current on a second side of the equipment to be protected. The first relay: calculates a first differential current and a first suppression current, using the first current and the second current which have been through a first filtering process for extracting a fundamental wave component; and performs a ratio differential relay operation based on the first differential current and the first suppression current. The third relay: performs an add operation of the first current and the second current which have been through a second filtering process for removing a DC component, and calculates a maximum of absolute values of results of add operations in a reference period as a third differential current; performs an add operation of a maximum of absolute values of the first current after the second filtering process in the reference period and a maximum of absolute values of the second current after the second filtering process in the reference period to calculate a result of the add operation as a third suppression current; and performs a ratio differential relay operation based on the third differential current and the third suppression current. The current differential relay apparatus, further includes: a detector that detects a harmonic component superimposed on a current flow through the equipment to be protected, based on the first current and the second current after the second filtering process; and an output controller that outputs an operation signal for protecting the equipment to be protected, based on a result of operation performed by the first relay, a result of detection by the detector, and a result of operation performed by the third relay.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereafter, the present embodiment will be described, with reference to the accompanying drawings. In the following description, like reference signs are used to refer to like parts, which are also assigned the same name and have the same function. Thus, descriptions of these parts will not be repeated.

Embodiment 1

<Overall Configuration>

Figure 1:
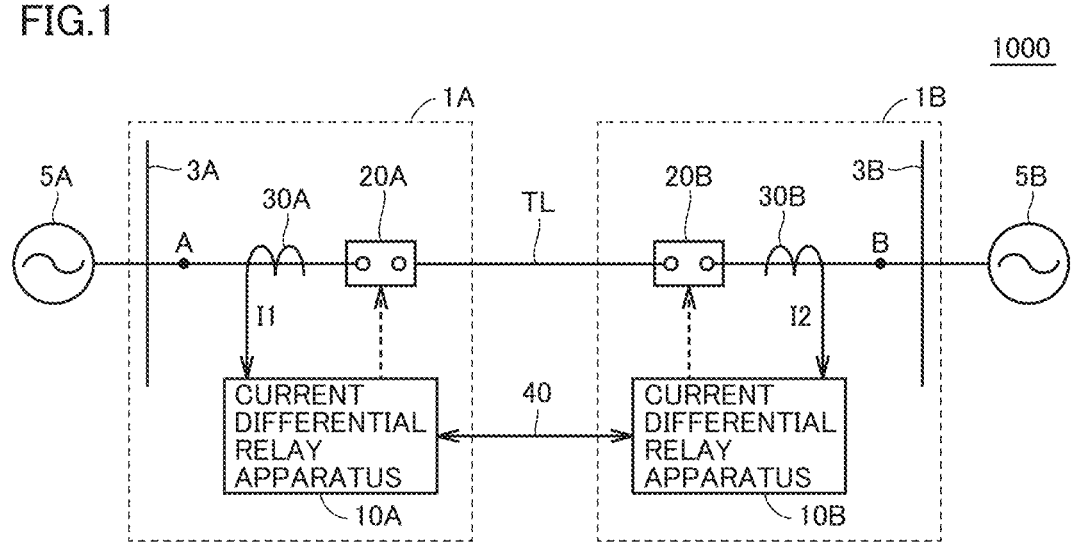
FIG. 1 is a diagram showing an example configuration of a protective relay system according to Embodiment 1.

FIG. 1 is a diagram showing an example configuration of a protective relay system 1000 according to Embodiment 1. Referring to FIG. 1, protective relay system 1000 is a system for protecting a power transmission line between two electric stations, using current differential relay apparatuses. Specifically, protective relay system 1000 includes an electric station 1A, an electric station 1B, a power transmission line TL connecting electric station 1A and electric station 1B, and a transmission path 40.

Transmission path 40 may be a power-dedicated communication network employing a PCM (Pulse Code Modulation) transmission scheme or an IP network-enabled network employing the transmission form of packet communications.

Electric station 1A includes a current differential relay apparatus 10A, a circuit breaker 20A which disconnects power transmission line TL in the event of a fault thereof or the like, and a current transformer (CT) 30A which detects current information of power transmission line TL. Electric station 1B includes a current differential relay apparatus 10B, a circuit breaker 20B which disconnects power transmission line TL in the event of a fault thereof or the like, and a CT 30B which detects current information of power transmission line TL. Power transmission line TL is connected to a bus 3A via circuit breaker 20A, and connected to a bus 3B via circuit breaker 20B. Note that bus 3A is connected to a back power supply 5A for electric station 1A, and bus 3B is connected to a back power supply 5B for electric station 1B. Back power supplies 5A, 5B are, for example, three-phase AC power supplies.

CT 30A detects a current I1 on the own end side (i.e., the point A side in FIG. 1) of power transmission line TL and outputs current I1 to current differential relay apparatus 10A. CT 30B detects a current I2 on the mating end side (i.e., the point B side in FIG. 1) of power transmission line TL, and outputs current I2 to current differential relay apparatus 10B.

Current differential relay apparatuses 10A, 10B (hereinafter, also collectively referred to as a "current differential relay apparatus 10") are, typically, digital current differential relay apparatuses employing a ratio differential scheme. Current differential relay apparatus 10A capture the current information (i.e., current I1) detected by CT 30A, converts the current information from analog to digital, and then transmits the current information to current differential relay apparatus 10B via transmission path 40. Current differential relay apparatus 10A receives the current information (i.e., current I2) obtained on the current differential relay apparatus 10B side, via transmission path 40.

Based on current I1 and current I2, current differential relay apparatus 10A performs a current differential operation to determine a failure of power transmission line TL. Upon detection of a failure (i.e., an internal failure) occurred within a power transmission line TL protection zone between electric station 1A and electric station 1B, current differential relay apparatus 10A outputs an interrupt command (e.g., a trip signal) to circuit breaker 20A. The same process as in current differential relay apparatus 10A is performed in current differential relay apparatus 10B.

<Hardware Configuration>

Figure 2:
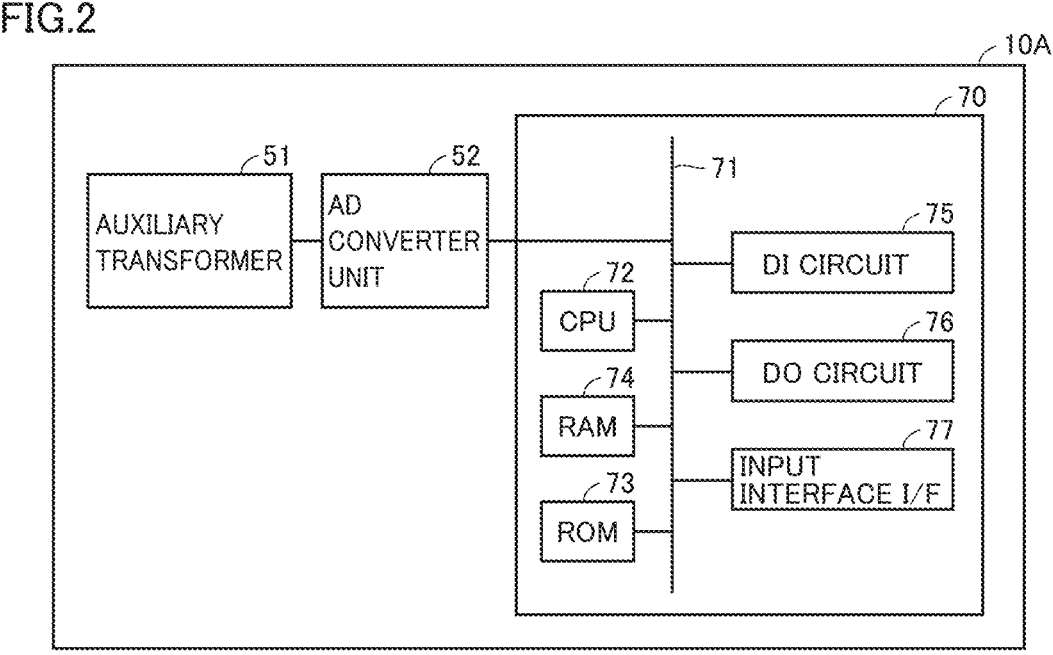
FIG. 2 is a diagram illustrating one example of a hardware configuration of a current differential relay apparatus according to Embodiment 1.

FIG. 2 is a diagram illustrating one example of a hardware configuration of current differential relay apparatus 10A according to Embodiment 1. Referring to FIG. 2, current differential relay apparatus 10A includes an auxiliary transformer 51, an analog-to-digital (AD) converter unit 52, and an arithmetic processing unit 70. Note that current differential relay apparatus 10B has the same hardware configuration as current differential relay apparatus 10A.

Auxiliary transformer 51 captures a current detected by CT 30A, converts the current into a voltage suitable for signal processing at the relay's internal circuit, and outputs the voltage. AD converter unit 52 captures the voltage output from auxiliary transformer 51, and converts the voltage into digital data. Specifically, AD converter unit 52 includes an analog filter, a sample and hold circuit, a multiplexer, and an AD converter.

A high-frequency component superimposed on a fault current of power transmission line TL is input to auxiliary transformer 51 via CT 30A. Therefore, the analog filter removes a high-frequency noise component from the waveform signal of the current output from auxiliary transformer 51. The sample and hold circuit samples the waveform signal of the current output from the analog filter, at predetermined sampling cycles. Based on a timing signal input from arithmetic processing unit 70, the multiplexer sequentially switches the waveform signals, input from the sample and hold circuit, on a time-series basis, and inputs the waveform signal to the AD converter. The AD converter converts the waveform signal, input from the multiplexer, from analog data to digital data. The AD converter outputs the waveform signal converted from analog to digital (i.e., digital data) to arithmetic processing unit 70.

Arithmetic processing unit 70 includes a central processing unit (CPU) 72, a ROM 73, a RAM 74, a digital input (DI) circuit 75, a digital output (DO) circuit 76, and an input interface (I/F) 77, which are coupled by a bus 71.

CPU 72 reads and executes programs pre-stored in ROM 73, thereby controlling the operation of current differential relay apparatus 10. Note that ROM 73 stores various pieces of information that are used by CPU 72. CPU 72 is, for example, a microprocessor. Note that the hardware may be other than a CPU, such as an FPGA (Field Programmable Gate Array), an ASIC (Application Specific Integrated Circuit), and any other circuit that has arithmetic functions.

CPU 72 captures the digital data from AD converter unit 52 via bus 71. Using the captured digital data, CPU 72 performs an operation, according to a program stored in ROM 73. Based on a result of the operation, CPU 72 outputs a signal to an external device via DO circuit 76. For example, DO circuit 76 outputs a trip signal to the circuit breaker. CPU 72 receives a signal from an external device via DI circuit 75. Input interface 77 is, typically, various buttons or the like, and receives various configuration actions from a system operator.

<Functional Configuration>

Figure 3:
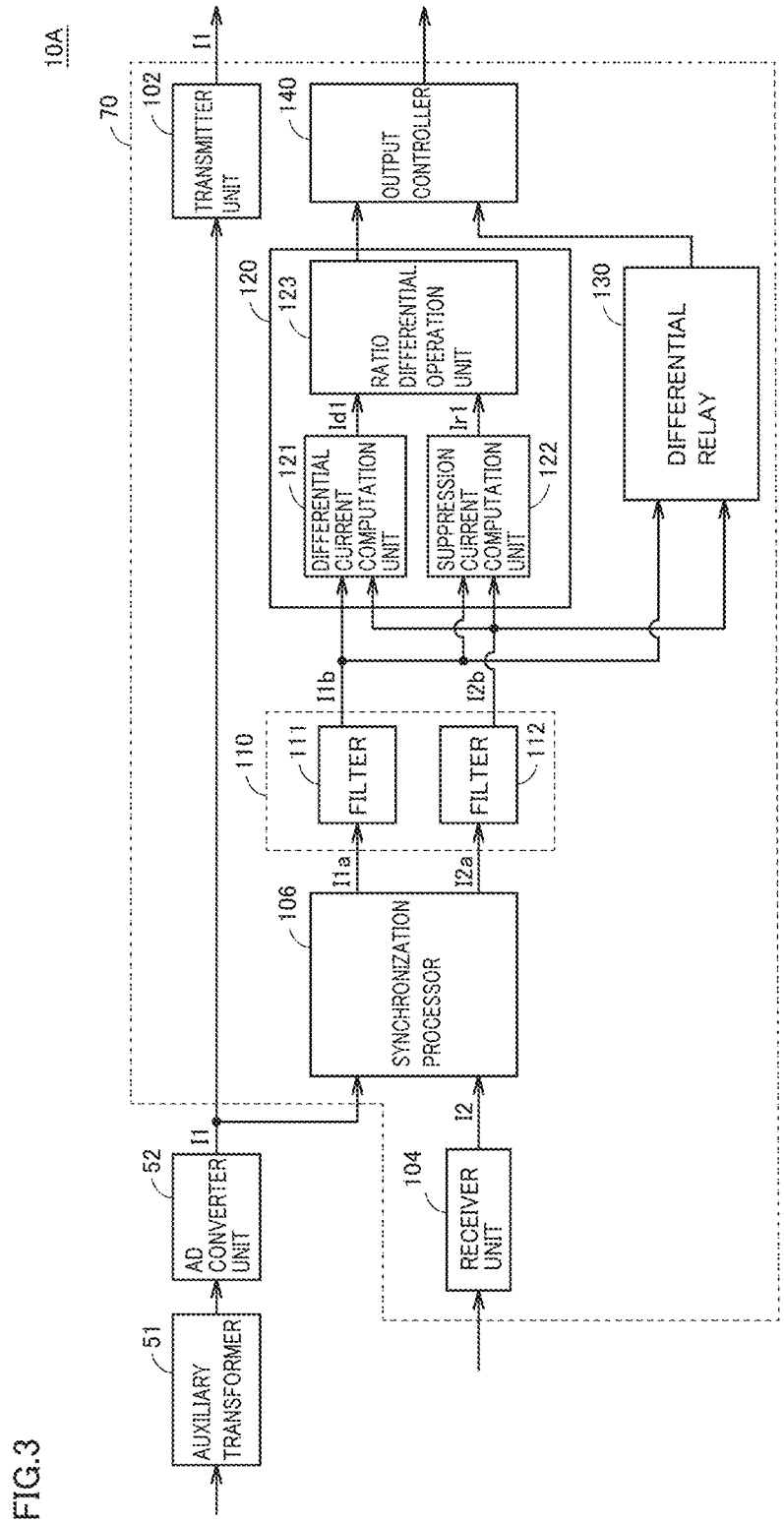
FIG. 3 is a block diagram showing one example of a functional configuration of the current differential relay apparatus according to Embodiment 1.

FIG. 3 is a block diagram showing one example of a functional configuration of current differential relay apparatus 10A according to Embodiment 1. Referring to FIG. 3, current differential relay apparatus 10A includes, as primary functional configurations, a transmitter 102, a receiver 104, a synchronization processor 106, a filter unit 110, differential relays 120, 130 which perform a relay operation using current I1 and current I2, and an output controller 140. These functions are implemented by, for example, the microprocessor included in arithmetic processing unit 70 of current differential relay apparatus 10A executing programs stored in a memory (e.g., ROM 73). Note that some or all of these functions may be implemented in hardware. Current differential relay apparatus 10B has the same functional configuration as current differential relay apparatus 10A.

Auxiliary transformer 51 obtains current I1 detected by CT 30A. AD converter unit 52 converts current I1, obtained from auxiliary transformer 51, into digital data.

Transmitter 102 transmits to current differential relay apparatus 10B via transmission path 40 current I1 converted from analog to digital by AD converter unit 52. Receiver 104 receives current I2 converted from analog to digital from current differential relay apparatus 10B via transmission path 40.

Synchronization processor 106 outputs current I1 synchronized in time with the received current I2. Specifically, synchronization processor 106 adjusts a current I1 sampling time so as to coincide with a current I2 sampling time, and selects current data of current I1 that is sampled at the same time as the sampling time of the received current I2 depending on a transmission delay time of transmission path 40, thereby performing the time synchronization. In the following, for the purposes of illustration, current I1 and current I2 having undergone the time synchronization process will be referred to as a current I1a and a current I2a, respectively.

Filter unit 110 filters current I1a and current I2a to extract the fundamental wave components from current I1 and current I2. Specifically, filter unit 110 includes filters 111, 112.

Filter 111 filters current I1 to extract the fundamental wave component having a system frequency from current I1, and outputs a current I1b after filtering. Filter 112 filters current I2a to extract the fundamental wave component of current I2a, and outputs a current I2b after filtering. A data length required to extract the fundamental wave component is a data length for 0.5 to 1 cycle, for example.

Using current I1b and current I2b having being filtered to extract the fundamental wave components, differential relay 120 calculates a differential current Id1 (specifically, the amplitude value or the effective value of differential current Id1) and a suppression current Ir1 (specifically, the amplitude value or the effective value of suppression current Ir1), and performs the ratio differential relay operation based on suppression current Ir1 and differential current Id1. Specifically, differential relay 120 includes a differential current computation unit 121, a suppression current computation unit 122, and a ratio differential operation unit 123.

After an add (i.e., vector sum) operation of current I1b and current I2b, differential current computation unit 121 performs an amplitude value operation (or an effective value operation), thereby calculating differential current Id1. After the amplitude value operation of each of current I1b and current I2b, suppression current computation unit 122 performs an add (i.e., scalar sum) operation of each amplitude value, thereby calculating suppression current Ir1. Note that suppression current computation unit 122 may calculate a greater one of the amplitude value of current I1b and the amplitude value of current I2b, as suppression current Ir1.

Based on differential current Id1 and suppression current Ir1, ratio differential operation unit 123 performs a ratio differential relay operation. Specifically, ratio differential operation unit 123 determines whether the predetermined relationships indicated in the following Equations (1) and (2) are met:

$$Id1 > p1 \times Ir1 + K1 \quad (1)$$

$$Id1 > p2 \times Ir1 - K2 \quad (2)$$

where constants p1, p2, K1, K2 are setting values of a relay. For example, constant p1 is set to "0.3," and constant p2 is set to "1.0." Given that the rated current of CT is In, constant K1 is set to "0.3×In," and constant K2 is set to "3×In." Constants K1, p1 are set to prevent a malfunction of the relay caused by a CT error. Constants K2, p2 are set to prevent a malfunction of the relay caused by CT saturation in the event of an external failure.

If differential current Id1 and suppression current Ir1 meet Equation (1) and Equation (2), ratio differential operation unit 123 outputs a signal indicating the operation of differential relay 120. In other words, differential relay 120 operates (e.g., produces the operating output) if Equation (1) and Equation (2) are both met.

Figure 4:
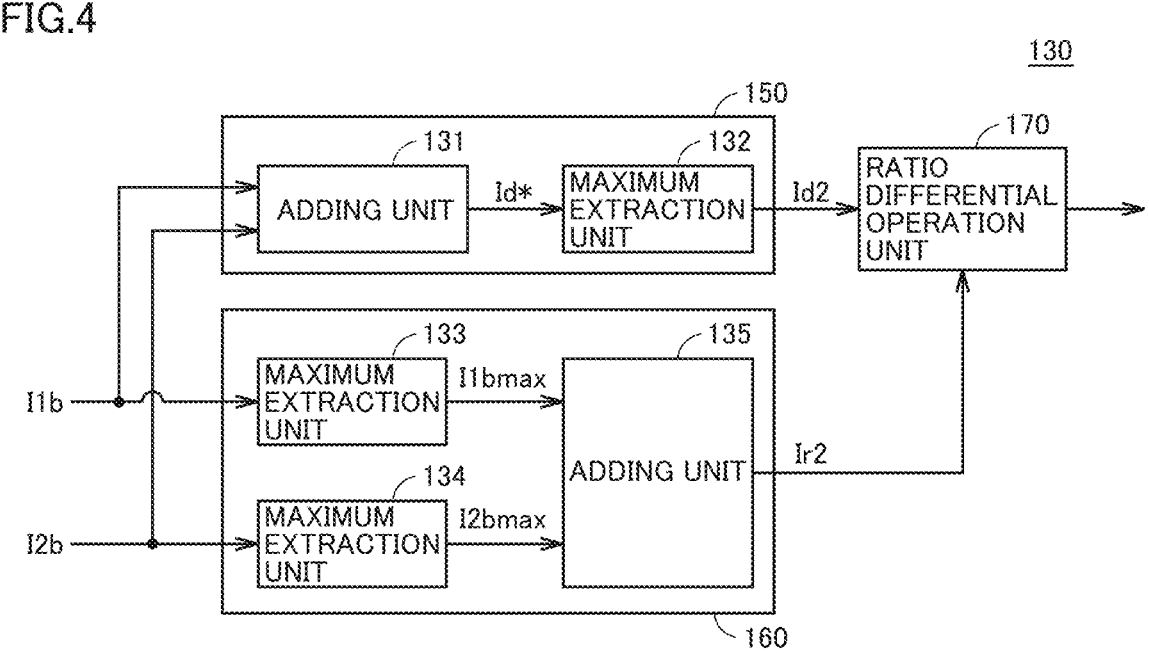
FIG. 4 is a block diagram showing a specific functional configuration of the differential relay according to Embodiment 1.

FIG. 4 is a block diagram showing a specific functional configuration of differential relay 130 according to Embodiment 1. Referring to FIG. 4, differential relay 130 calculates a differential current Id2 and a suppression current Ir2, using current I1b and current I2b having being filtered to extract the fundamental wave components, and performs a ratio differential relay operation based on differential current Id2 and suppression current Ir2. Specifically, differential relay 130 includes a differential current computation unit 150, a suppression current computation unit 160, and a ratio differential operation unit 170.

Differential current computation unit 150 performs an add operation of current I1b and current I2b, and calculates the maximum of absolute values of results of add operations in a reference period (e.g., a 0.5 cycle period immediately before the current time), as differential current Id2. Specifically, differential current computation unit 150 includes an adding unit 131 and a maximum extraction unit 132.

Adding unit 131 performs an add (i.e., vector sum) operation of current I1b and current I2b, and outputs a current Id*, which is a result of the add operation.

A period from the current time t to the n-th previous sampling time (t−n) is set as the reference period. For example, where the reference period is 0.5 cycle and the sampling interval is an electrical angle of 30 degrees, n=6. Current Id* computed at the sampling time of this time (i.e., the current time t) is represented as Id*(t), and current Id* computed at the time (t−n) is represented as Id*(t−n). In this case, adding unit 131 outputs currents Id*(t−n), . . . , Id*(t−1), Id*(t) in the reference period.

Maximum extraction unit 132 extracts the maximum of absolute values |Id*(t−n)|, . . . , |Id*(t−1)|, |Id*(t)| respectively corresponding to currents Id*(t−n), . . . , Id*(t−1), Id*(t) output from adding unit 131. Maximum extraction unit 132 calculates the extracted maximum as differential current Id2.

Suppression current computation unit 160 performs an add operation of the maximum of the absolute values of current I1b in the reference period and the maximum of absolute values of current I2b in the reference period, and calculates a result of the add operation as suppression current Ir2. Specifically, suppression current computation unit 160 includes maximum extraction units 133, 134 and an adding unit 135.

Current I1b at the current time t is represented as I1b (t), and current I1b at the time (t−n) is represented as I1b (t−n). Maximum extraction unit 133 extracts the maximum of absolute values ♂I1b (t−n)|, . . . , |I1b (t)| respectively corresponding to currents I1b (t−n), . . . , I1b (t). Maximum extraction unit 133 outputs the extracted maximum I1bmax.

Current I2b at the current time t is represented as I2b (t), and current I2b at the time (t−n) is represented as I2b (t−n). Maximum extraction unit 134 extracts the maximum of absolute values |I2b (t−n)|, . . . , |I2b (t)| corresponding to currents I2b (t−n), . . . , I2b (t). Maximum extraction unit 134 outputs the extracted maximum I2bmax.

Adding unit 135 adds maximum I1bmax and maximum I2bmax and calculates a result of the add operation (i.e., I1bmax+I2bmax) as suppression current Ir2.

Based on differential current Id2 and suppression current Ir2, ratio differential operation unit 170 performs a ratio differential relay operation. Specifically, ratio differential operation unit 170 determines whether the predetermined relationships indicated in the following Equations (3) and (4) are met.

$$Id2 > p3 \times Ir2 + K3 \qquad (3)$$

$$Id2 > p4 \times Ir2 - K4 \qquad (4)$$

where constants p3, p4, K3, K4 are setting values of a relay. For example, constant p3 is set to the same value as constant p1, and constant p4 is set to the same value as constant p2, provided that constant K3 is set to a value greater than constant K1 (i.e., K3>K1), and constant K4 is set to a value less than constant K2 (i.e., K4<K2). This is to render the operational area of differential relay 130, utilizing the maximum, narrower than the operational area of differential relay 120 utilizing the amplitude value operation.

Specifically, differential current Id1 and a suppression current Ir1 are calculated, using the amplitude value operation of current I1b and current I2b, while differential current Id2 and suppression current Ir2 are calculated, using the maximum of current I1b and current I2b in the reference period. With the use of the amplitude value operation, the differential current and suppression current accurately reflecting a fault state are obtained by using data after the failure for the operations, including data required for the filtering process. Thus, the operation of differential relay 120 can be determined in a stable manner.

With the use of the maximum, in contrast, an error can occur, depending on the sampling timing of instantaneous values of current I1b and current I2b. For current I1b, depending on the sampling timing, the maximum of absolute values of the sampled multiple instantaneous values (e.g., I1b (t−n), . . . , I1b (t)) may not match the maximum of current I1b in the reference period. Assuming the sampling at an electrical angle of 30 degrees, the maximum is properly obtained if the current peak is captured at the sampling timing. However, if the timing of the current peak is at an intermediate time of the electrical angle of 30 degrees, the maximum of absolute values of the sampled instantaneous values is, based on Sin 75 degrees=0.9659, 0.9659 times the maximum of current I1b in the reference period, giving rise to generally 3.5% error.

Therefore, K3>K1 and K4<K2 are set so that the operational area of differential relay 130 utilizing the maximum is narrower than the operational area of differential relay 120 utilizing the amplitude value operation. Assuming that the sampling error is 3.5%, and, further, a margin is, for example, 10%, considering the effects of harmonic distortion of the current input, K3=1.1×K1 is set and K4=0.9×K2 is set.

If differential current Id2 and suppression current Ir2 meet Equation (3) and Equation (4), ratio differential operation unit 170 outputs a signal indicating the operation of differential relay 130. In other words, differential relay 130 operates if Equation (3) and Equation (4) are both met.

Figure 5:
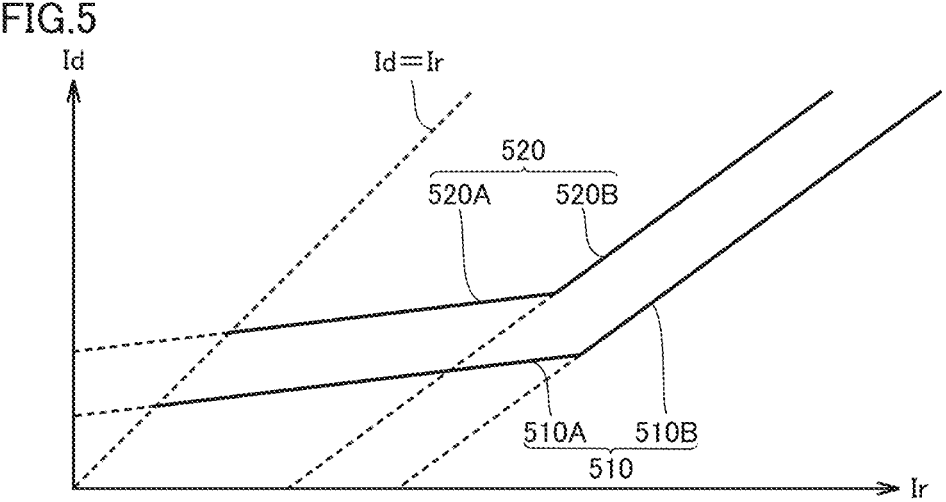
FIG. 5 is a diagram for illustrating ratio differential characteristics according to Embodiment 1.

FIG. 5 is a diagram for illustrating ratio differential characteristics according to Embodiment 1. In FIG. 5, differential current Id is indicated on the vertical axis, and suppression current Ir is indicated on the horizontal axis. Referring to FIG. 5, a graph 510 shows ratio differential characteristics of differential relay 120. Specifically, a graph 510 is a polygonal line consisting of a linear line 510A and a linear line 510B. The region above the polygonal line is the operational area of differential relay 120. Linear line 510A corresponds to Equation (1). Linear line 510B corresponds to Equation (2).

A graph 520 shows ratio differential characteristics of differential relay 130. Specifically, a graph 520 is a polygonal line consisting of a linear line 520A and a linear line 520B. The region above the polygonal line is the operational area of differential relay 130. Linear line 520A corresponds to Equation (3). Linear line 520B corresponds to Equation (4). It is to be understood, as shown in FIG. 5, that differential relay 130 has a narrower operational area than differential relay 120.

However, the operating time of differential relay 130 not utilizing the amplitude value operation is shorter than the operating time of differential relay 120 utilizing the amplitude value operation.

Figure 6:
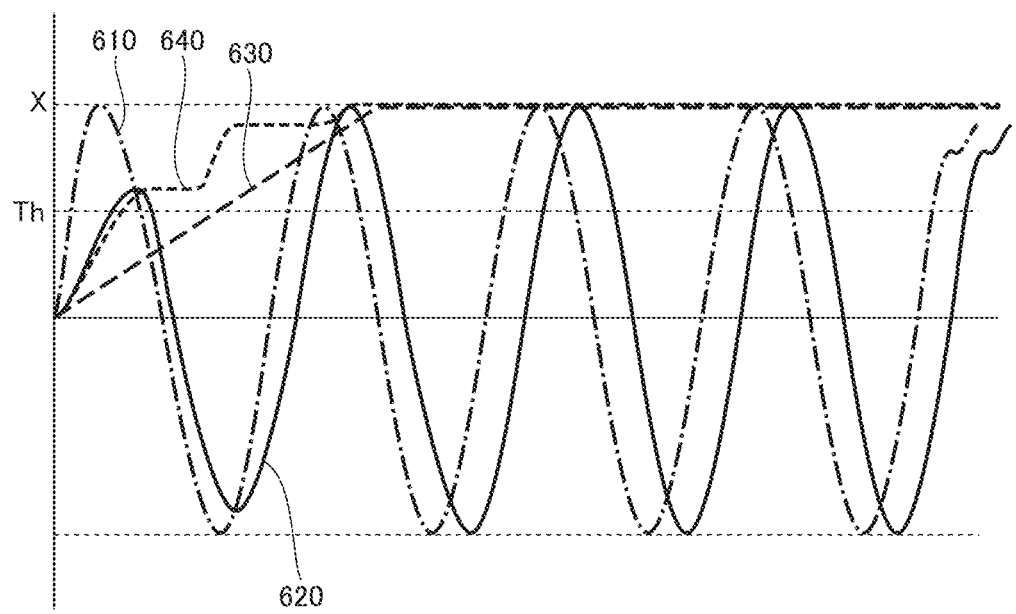
FIG. 6 is a diagram showing changes in waveforms over time.

FIG. 6 is a diagram showing changes in waveforms over time. Referring to FIG. 6, a graph 610 shows an alternating-current waveform converted from analog to digital in the event of an internal failure (e.g., the waveform of current I1). A graph 620 shows an alternating-current waveform after filtering (e.g., the waveform of current I1b). A graph 630 shows a value after the amplitude value operation (e.g., the amplitude value of current I1b). A graph 640 shows the maximum of the absolute values of current I1b in the reference period (e.g., 0.5 cycle).

In the amplitude value operation process, after the occurrence of a failure and over a period in which data, comingling data after the failure and data before the failure, is used for the operation, data that is used for operation all become those after the failure, and then a correct amplitude value is obtained. Here, the data length required for the filtering process is, for example, a data length for 0.5 to 1 cycle, and the data length required for the amplitude value operation is, for example, a data length for 0.5 cycle, the sum of which is a data length for 1 to 1.5 cycle. Therefore, it takes 1 to 1.5 cycle for the value after the amplitude value operation, shown in graph 630, to be constant, which is longer than 1 cycle. It is to be understood that, in the example of FIG. 6, the value shown in graph 630 is constant (e.g., value X) after about 1.5 cycle. In the maximum operation process, in contrast, the maximum is finalized at a moment the data of the current time is in the vicinity of a peak of the amplitude in response to an increase of the fault current after the occurrence of a failure. Therefore, the maximum shown in graph 640 stabilizes with a delay, by a phase shift of the filter (e.g., 60 degrees in the case of FIG. 6), behind 0.5 to 1 cycle corresponding to the data length required for the filtering process. Note that the amount of the phase shift depends on the filter operation expression, and is within a range of 0 degrees±180 degrees. However, the amount of the phase shift does not exceed the range of 0 degrees±90 degrees because absolute values of the current are taken. Moreover, in general, the operating time is defined by a current input that is at least twice the operating limit (i.e., the operational setting value). For example, if the operating time is defined by a current input that is twice the operational setting value, an operational setting value Th is set to ½ the value X. Referring to FIG. 6, it is to be understood that the maximum represented by graph 640 reaches operational setting value Th earlier than the value represented by graph 630. Accordingly, the operating time of differential relay 130 utilizing the maximum is shorter than the operating time of differential relay 120.

As described with respect to FIG. 5, while the operational area of differential relay 130 is set narrower than the operational area of differential relay 120 due to an error in sampling timing, differential relay 130 is allowed to operate at a higher speed than differential relay 120.

Referring again to FIG. 4, output controller 140 outputs an operation signal (e.g., a trip signal) for protecting power transmission line TL, based on a result of operation performed by differential relay 120 and a result of operation performed by differential relay 130. Specifically, if at least one of differential relay 120 and differential relay 130 operates, output controller 140 outputs a trip signal to circuit breaker 20A. This opens circuit breaker 20A, disconnecting the power transmission line from the power system.

As such, a trip signal is output at a moment either one of differential relays 120, 130 operates. Therefore, differential relay 130 having a narrower operational area operates at a higher speed when the fault current that flows in the event of an internal failure is relatively large. Thus, an internal failure can be eliminated rapidly. Even if the fault current that flows in the event of an internal failure is small, in contrast, differential relay 120 having a wider operational area is operable. Thus, an internal failure can be eliminated.

Advantageous Effects

According to current differential relay apparatus 10 of Embodiment 1, since current differential relay apparatus 10 operates at a high speed when the fault current that flows in the event of an internal failure is relatively large, an internal failure can be more rapidly eliminated.

Embodiment 2

While Embodiment 1 has been described above with reference to utilizing the data that has been filtered by a filter for extracting the fundamental wave component, Embodiment 2 will be described with reference to further speeding up the operation of a current differential relay apparatus 10 by using a filter different from the above filter.

Figure 7:
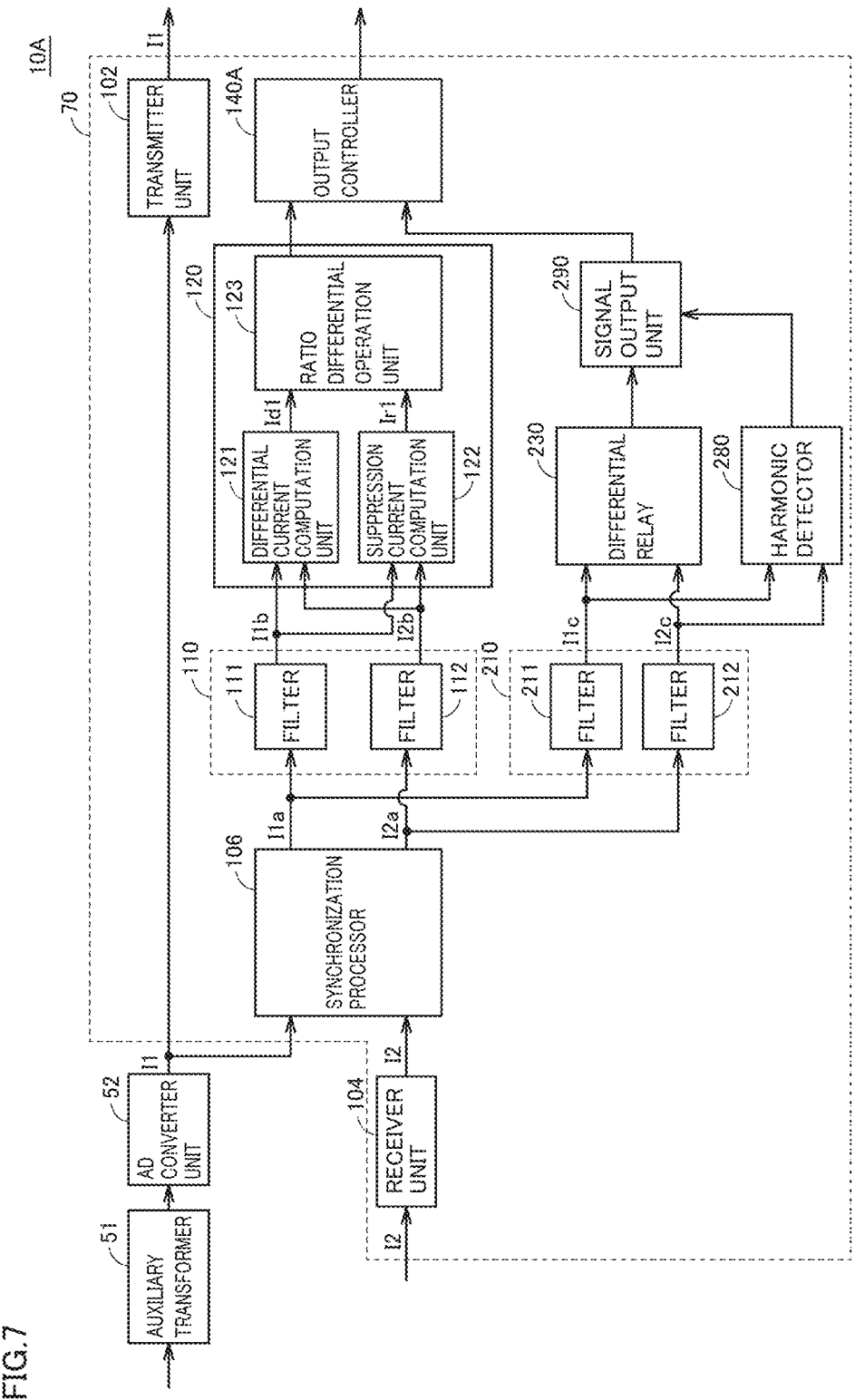
FIG. 7 is a diagram illustrating one example of a functional configuration of a current differential relay apparatus according to Embodiment 2.

FIG. 7 is a diagram illustrating one example of a functional configuration of current differential relay apparatus 10 according to Embodiment 2. Referring to FIG. 7, current differential relay apparatus 10A according to Embodiment 2 includes a transmitter 102, a receiver 104, a synchronization processor 106, filter units 110, 210, differential relays 120, 230 which perform a relay operation, using a current I1 and a current I2, an output controller 140A, a harmonic detector 280, and a signal output unit 290. These functions are implemented by, for example, a microprocessor included in an arithmetic processing unit 70 of current differential relay apparatus 10A executing programs stored in a memory. Note that some or all of these functions may be implemented in hardware.

Transmitter 102, receiver 104, synchronization processor 106, filter unit 110, and differential relay 120 have the same configuration as those described with respect to FIG. 3, and thus the detailed description thereof will not be repeated.

Filter unit 210 filters current I1$a$ and current I2$a$ to remove a DC component from current I1$a$ and current I2$a$. Specifically, filter unit 210 includes filters 211, 212.

Filter 211 filters current I1$a$ to remove a DC component from current I1$a$, and outputs a current I1$c$ after filtering. Filter 212 filters current I2$a$ to remove a DC component from current I2$a$, and outputs a current I2$c$ after filtering. For example, the filtering process of filtering a current to remove a DC component from the current is a difference operation process in which data that is $\frac{1}{12}$ cycle before data of the current time (i.e., before an electrical angle of 30 degrees) is subtracted from the data of the current time. In this case, the data length required for this filtering process is a data length for $\frac{1}{12}$ a cycle. Therefore, the data lengths required for this filtering process by filters 211, 212 are shorter than the data length required for the filtering process by filters 111, 112$a$ (e.g., a data length for 0.5 to 1 cycle).

Differential relay 230 performs a relay operation, using current I1$c$ and current I2$c$ having being filtered to extract the DC component. Differential relay 230 performs a relay operation, utilizing the maximum of the current in a reference period.

A DC component depending on a resistance and a reactance of the system is superimposed on a fault current in the system, depending on a phase in which a failure has occurred. However, in the scheme utilizing the maximum in a reference period, this DC component is an error factor for the amplitude value. Therefore, current I1$a$ and current I2$a$ are filtered to remove the DC component. Note that since currents I1$b$, I2$b$, which are used in differential relay 130 according to Embodiment 1, have been filtered to extract the fundamental wave component, the DC component has been removed from currents I1$b$, I2$b$.

If a harmonic component is superimposed on the current flow through a power transmission line TL, harmonic detector 280 detects the harmonic component, based on current I1$c$ and current I2$c$. Signal output unit 290 outputs a signal indicating the operation of differential relay 230, based on a result of the operation performed by differential relay 230 and a result of the detection by harmonic detector 280.

Figure 8:
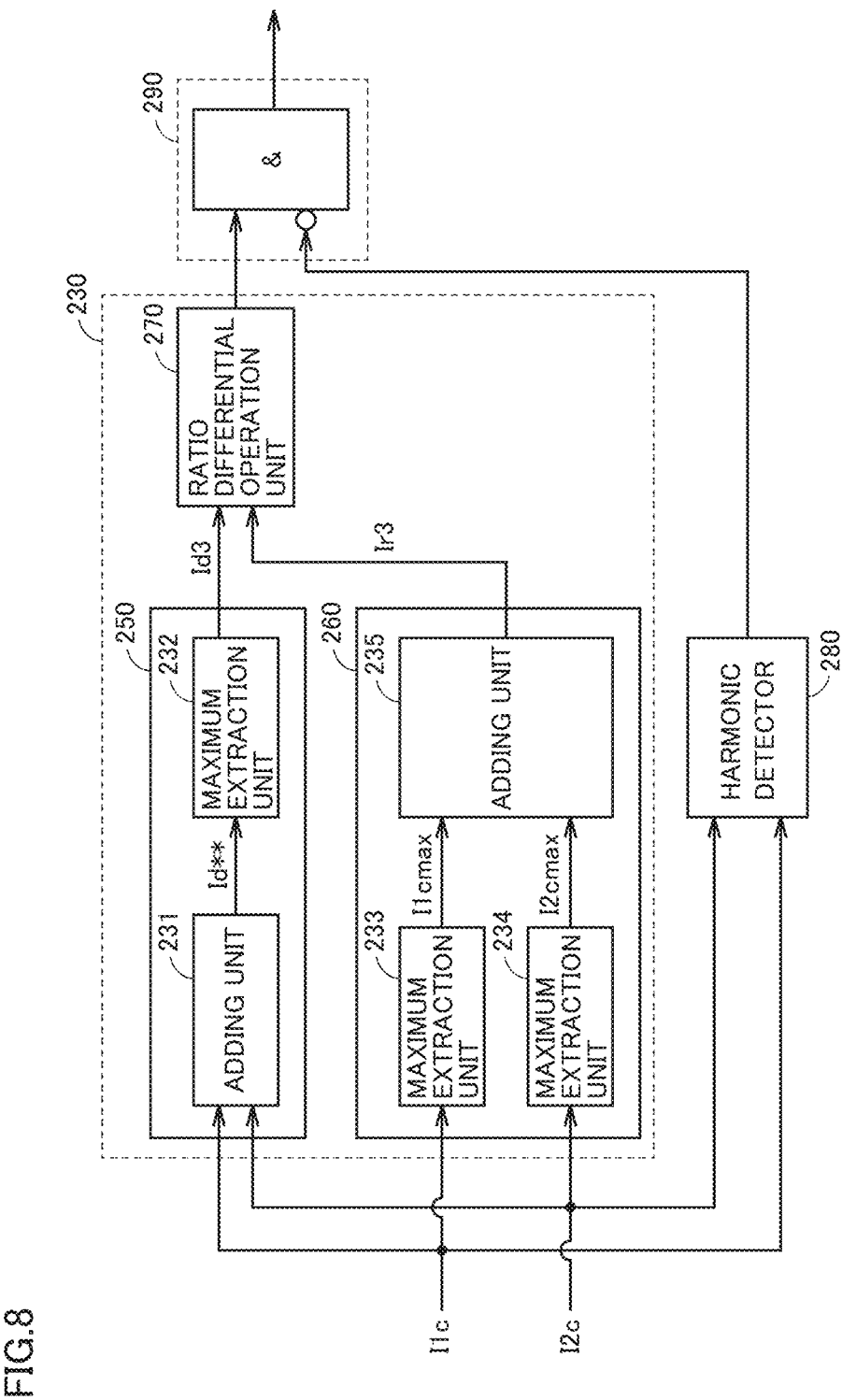
FIG. 8 is a block diagram showing a specific functional configuration of the differential relay according to Embodiment 2.

FIG. 8 is a block diagram showing a specific functional configuration of differential relay 230 according to Embodiment 2. Referring to FIG. 8, differential relay 230 includes a differential current computation unit 250, a suppression current computation unit 260, and a ratio differential operation unit 270. Note that differential relay 230 has generally the same functionality as differential relay 130.

Differential current computation unit 250 performs an add operation of current I1$c$ and current I2$c$ and calculates the maximum of absolute values of a result of the add operation in a reference period, as a differential current Id3. Specifically, differential current computation unit 250 includes an adding unit 231 and a maximum extraction unit 232.

Adding unit 231 performs an add operation of current I1$c$ and current I2$c$, and outputs a current Id, which is a result of the add operation. Current Id computed at this sampling time (i.e., the current time t) is represented as Id**(t), and a current Id* computed at the time (t−n) is represented as Id(t−n). In this case, adding unit 231 outputs currents Id(t−n), . . . , Id**(t) within the reference period.

Maximum extraction unit 232 extracts the maximum of absolute values |Id(t−n)|, . . . , |Id(t)| corresponding to currents Id(t−n), . . . , Id(t). Maximum extraction unit 232 calculates the extracted maximum as differential current Id3.

Suppression current computation unit 260 performs an add operation of the maximum of the absolute values of current I1c in the reference period and the maximum of the absolute values of current I2c in the reference period, and calculates a result of the add operation as a suppression current Ir3. Specifically, suppression current computation unit 260 includes maximum extraction units 233, 234 and an adding unit 235.

Current I1c at the current time t is represented as I1c (t), and current I1c at the time (t−n) is represented as I1c (t−n). Maximum extraction unit 233 extracts the maximum of absolute values |I1c (t−n)|, . . . , |I1c (t)| corresponding to currents I1c (t−n), . . . , I1c (t). Maximum extraction unit 233 outputs the extracted maximum I1cmax.

Current I2c at the current time t is represented as I2c (t), and current I2c at the time (t−n) is represented as I2c (t−n). Maximum extraction unit 234 extracts the maximum of absolute values |I2c (t)| corresponding to currents I2c (t−n), . . . , I2c (t). Maximum extraction unit 234 outputs the extracted maximum I2cmax.

Adding unit 235 adds maximum I1cmax and maximum I2cmax, and calculates a result of the add operation as suppression current Ir3.

Based on differential current Id3 and suppression current Ir3, ratio differential operation unit 270 performs a ratio differential relay operation. Specifically, ratio differential operation unit 270 determines whether the predetermined relationships indicated in the following Equations (5) and (6) are met.

$$Id3 > p5 \times Ir3 + K5 \tag{5}$$

$$Id3 > p6 \times Ir3 - K6 \tag{6}$$

where constants p5, p6, K5, K6 are setting values of a relay. For example, constant p5 is set to the same value as constants p1, p3, and constant p6 is set to the same value as constants p2, p4, provided that constant K5 is set to a value greater than constants K1, K3 (e.g., K5>K3>K1), and constant K6 is set to a value less than constants K2, K4 (i.e., K6<K4<K2). This is to render the operational area of differential relay 230 narrower than the operational areas of differential relays 120, 130 described above.

Specifically, differential current Id3 and suppression current Ir3 are computed, using current I1c and current I2c having through a filtering process requiring a short data length and for removing the DC component (e.g., a filtering process by a difference operation process). The filtering process requiring a short data length has a characteristic that the filtering process amplifies a harmonic component, and thus is further susceptible to a harmonic when the harmonic is superimposed on a fault current. Therefore, the operational area of differential relay 230 is set narrower than the operational areas of differential relays 120, 130.

If differential current Id3 and suppression current Ir3 meet Equation (5) and Equation (6), ratio differential operation unit 270 outputs a signal (e.g., an output value "1") indicating the operation of differential relay 230. In other words, differential relay 230 operates if Equation (5) and Equation (6) are both met.

Figure 9:
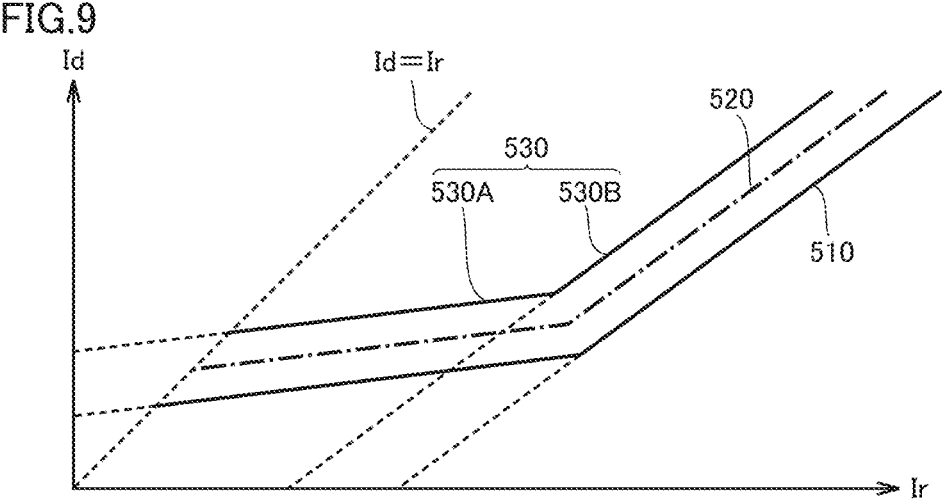
FIG. 9 is a diagram for illustrating ratio differential characteristics according to Embodiment 2.

FIG. 9 is a diagram for illustrating ratio differential characteristics according to Embodiment 2. In FIG. 9, a differential current Id is indicated on the vertical axis and a suppression current Ir is indicated on the horizontal axis. Referring to FIG. 9, a graph 510 shows ratio differential characteristics of differential relay 120. Note that a graph 520 for the ratio differential characteristics of differential relay 130 is shown for comparison.

A graph 530 shows ratio differential characteristics of differential relay 230. Specifically, a graph 530 is a polygonal line consisting of a linear line 530A and a linear line 530B. The region above the polygonal line is the operational area of differential relay 230. Linear line 530A corresponds to Equation (5). Linear line 530B corresponds to Equation (6). It is to be understood, as shown in FIG. 9, that differential relay 230 has a narrower operational area than differential relays 120, 130.

Referring again to FIG. 8, harmonic detector 280 detects a harmonic component superimposed on the current on power transmission line TL, based on the number of polarity changes of the current during a period of time (e.g., 0.5 cycle). For example, current I1c at the current time t is represented as I1c (t), and current I1c at the time (t−n) is represented as I1c (t−n), where n is the number of sampling corresponding to 0.5 cycle, and n=6 when the electrical angle is 30 degrees.

Harmonic detector 280 calculates a difference ΔI1c (t) of current I1c, where ΔI1c (t) is "I1c (t)−I1c (t−1)," and ΔI1c (t−(n−1)) is "I1c (t−(n−1))−I1c (t−n)."

Figure 10:
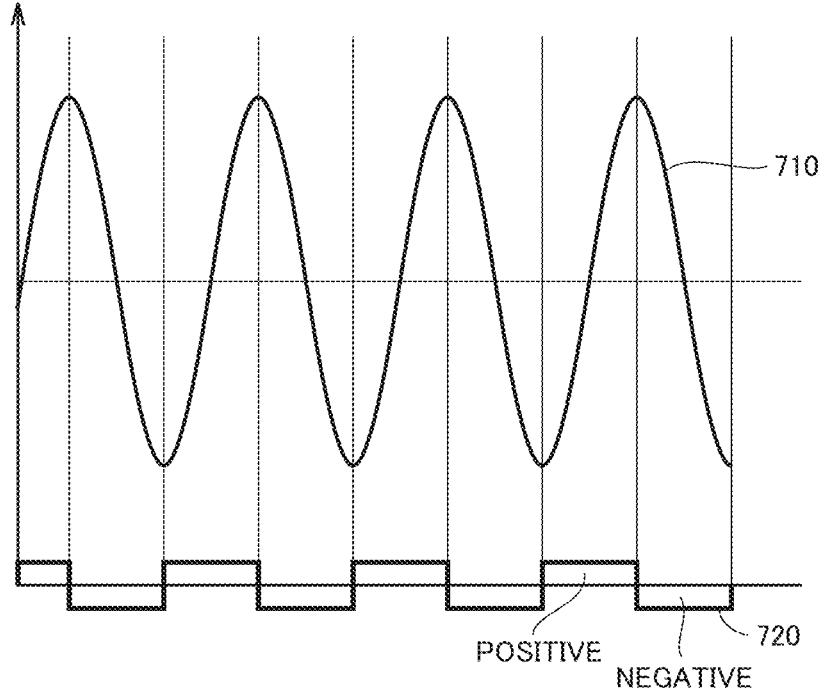
FIG. 10 is a diagram for illustrating a harmonic detection scheme according to Embodiment 2.

FIG. 10 is a diagram for illustrating a harmonic detection scheme according to Embodiment 2. Referring to FIG. 10, a graph 710 shows a waveform of current I1c having the DC component removed therefrom. A graph 720 shows the polarity of difference ΔI1c (t). If no harmonic component is superimposed on current I1c, the polarity of ΔI1c (t) switches between positive and negative for every 0.5 cycle, except for the point of occurrence of a failure. Therefore, for ΔI1c (t−1), . . . , ΔI1c (t−(n−1)), harmonic detector 280 determines that a harmonic component is superimposed on current I1c if there is more than one polarity change.

For example, harmonic detector 280 detects a harmonic component and outputs an output value "1" to signal output unit 290 if two or more of the following conditions are met: "ΔI1c (t)×ΔI1c (t−1)<0;" "ΔI1c (t−1)×ΔI1c (t−2)<0;" . . . ; "ΔI1c (t−(n−2))×ΔI1c (t−(n−1))<0."

Referring again to FIG. 8, signal output unit 290 includes, for example, an AND gate, and performs an AND operation of the output value of ratio differential operation unit 270 and an inverse value of the output value of harmonic detector 280.

Specifically, if no harmonic component is detected (e.g., the output value of harmonic detector 280 is "0") and differential relay 230 operates (e.g., the output value of ratio differential operation unit 270 is "1"), signal output unit 290 outputs a signal indicating the operation of differential relay 230.

In contrast, if a harmonic component is detected (e.g., if the output value of harmonic detector 280 is "1"), signal output unit 290 outputs no signal indicating the operation of differential relay 230 even though differential relay 230 operates (e.g., if the output value of ratio differential operation unit 270 is "1"). In other words, the operation of differential relay 230 is locked.

Referring again to FIG. 7, output controller 140A outputs an operation signal for protecting power transmission line TL, based on a result of the operation performed by differential relay 120, and an output result of signal output unit 290 that is based on a result of the detection by harmonic detector 280 and a result of the operation performed by differential relay 230. Specifically, output controller 140A outputs the operation signal if at least one of the following conditions are met: the differential relay 120 operates; and signal output unit 290 outputs the signal indicating the operation of differential relay 230.

As such, differential relay 230 performs a ratio differential operation, based on differential current Id3 and suppression current Ir3 using current I1c and current I2c having through a filtering process requiring a short data length. Therefore, differential relay 230 is allowed to operate at an even higher speed than differential relay 130. In contrast, if many harmonic components are superimposed on the current that flows through power transmission line TL in the event of a failure, the operation of differential relay 230 having a large error in the operation determination is locked, thereby preventing a malfunction. Instead of differential relay 230, differential relay 120 that can determine its operation in a stable manner operates and eliminates an internal failure.

Embodiment 3

Embodiment 3, which is a combination of Embodiment 1 and Embodiment 2, is now described.

Figure 11:
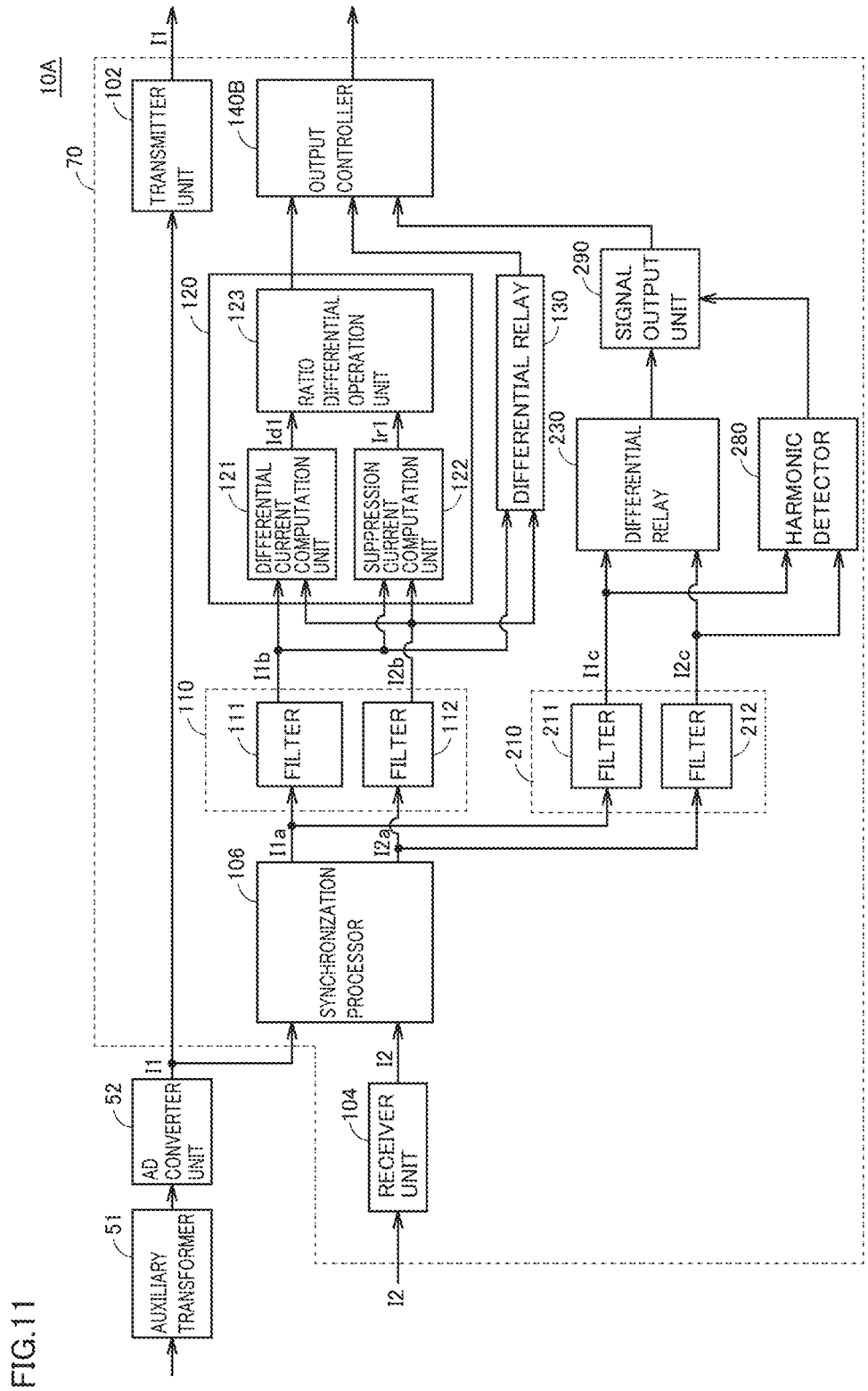
FIG. 11 is a diagram illustrating one example of a functional configuration of a current differential relay apparatus according to Embodiment 3.

FIG. 11 is a diagram illustrating one example of a functional configuration of a current differential relay apparatus 10A according to Embodiment 3. Referring to FIG. 11, a functional configuration of current differential relay apparatus 10A according to Embodiment 3 corresponds to the functional configuration according to Embodiment 2 shown in FIG. 7 having a differential relay 130 added thereto and including an output controller 140B replacing the output controller 140A. Here, a functional configuration of output controller 140B is described.

Output controller 140B outputs an operation signal for protecting a power transmission line TL, based on a result of operation performed by a differential relay 120, a result of operation performed by differential relay 130, and an output result of a signal output unit 290. Specifically, output controller 140B outputs the operation signal if at least one of the following conditions are met: differential relay 120 has operated; differential relay 130 has operated; and that signal output unit 290 has output the signal indicating the operation of differential relay 230.

Figure 12:
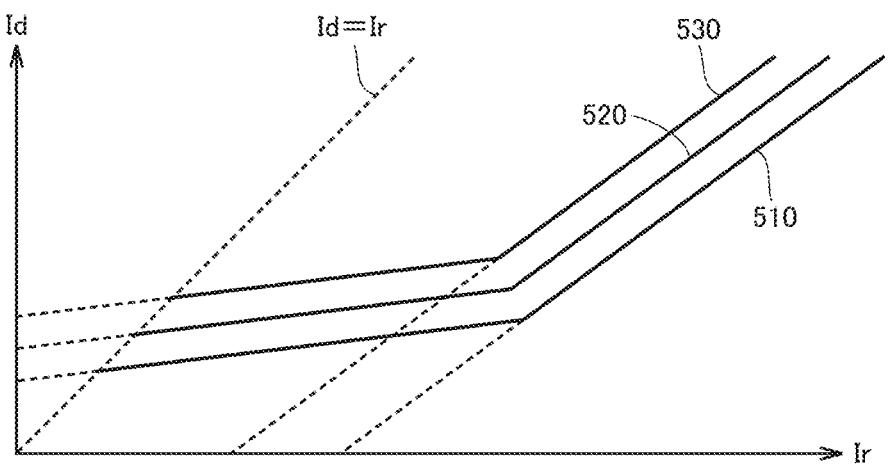
FIG. 12 is a diagram for illustrating ratio differential characteristics according to Embodiment 3.

FIG. 12 is a diagram for illustrating ratio differential characteristics according to Embodiment 3. FIG. 12 shows graphs 510, 520, 530 illustrating ratio differential characteristics of differential relays 120, 130, 230.

If many harmonic components are superimposed on a fault current and differential relay 230 is not allowed to operate, differential relay 130 operates, thereby allowing the current differential relay apparatus 10A to operate at a high-speed corresponding to Embodiment 1. If a small amount of harmonic component are superimposed on a fault current, differential relay 230 operates, thereby allowing the current differential relay apparatus 10A to operate at a high-speed corresponding to Embodiment 2.

Other Embodiments (1) While the embodiments have been described above, with reference to equipment to be protected being a power transmission line, the present disclosure is not limited to this configuration. For example, the equipment to be protected may be a transformer. In this case, current differential relay apparatus 10 obtains a current on a primarily side of the transformer as current I1 above, and obtains a current on a secondary side of the transformer as current I2 above. Note that if the transformer is the equipment to be protected, a current matching process depending on the winding of the transformer is necessary, and transmitter 102, receiver 104, and synchronization processor 106, which are necessary when the equipment to be protected is a power transmission line, are not necessary.

(2) While Embodiment 1 has been described above, with reference to current I1 converted from analog to digital by AD converter unit 52 being transmitted to current differential relay apparatus 10B, the present disclosure is not limited to this configuration. For example, current differential relay apparatus 10A may filter the current I1, converted from analog to digital, to extract the fundamental wave component therefrom, and transmits current I1 after filtering to current differential relay apparatus 10B. In this case, current differential relay apparatus 10A receives current I2 after filtering, and performs a synchronization process on current I1 and current I2 after filtering.

(3) While Embodiment 2 has been described above, with reference to setting the operational area of differential relay 230 narrower than the operational area of differential relay 130, and, when harmonic detector 280 detects a harmonic, locking the operation of differential relay 230, the present disclosure is not limited to this configuration. For example, the operational area of differential relay 230 may be set to be the same as the operational area of differential relay 130, and, when harmonic detector 280 detects a harmonic, the operational area of differential relay 230 may be changed to be narrower than the operational area of differential relay 130.

Typically, harmonic detector 280 outputs a result of detection of harmonic component to ratio differential operation unit 270. If a harmonic component is detected (i.e., if received a result that a harmonic component has been detected), differential relay 230 (specifically, ratio differential operation unit 270) sets the operational area of differential relay 230 narrower than the operational area of differential relay 130, and performs the ratio differential relay operation. A result of the relay operation performed by differential relay 230 is output to output controller 140A. Accordingly, in this case, signal output unit 290 is not necessary.

Output controller 140A outputs an operation signal for a protecting power transmission line TL, based on a result of the relay operation performed by differential relay 120 and a result of the operation performed by differential relay 230. Specifically, output controller 140A outputs the operation signal if at least one of differential relay 120 and differential relay 230 operates.

(4) The configurations illustrated above as the embodiments are one example of the configuration according to the present disclosure, and can be combined with another well-known technology or some of the configuration can be omitted, without departing from the spirit and scope of the present disclosure. Moreover, the embodiments described above may be implemented, employing the processes and configurations described in other embodiments as appropriate.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A current differential relay apparatus, comprising a first relay and a second relay that perform a relay operation, using a first current on a first side of equipment to be protected and a second current on a second side of the equipment to be protected, wherein
the first relay:
calculates a first differential current and a first suppression current, using the first current and the second current; and
performs a ratio differential relay operation based on the first differential current and the first suppression current, and
the second relay:
performs an add operation of the first current and the second current, and calculates a maximum of absolute values of results of add operations in a reference period as a second differential current;
performs an add operation of a maximum of absolute values of the first current in the reference period and a maximum of absolute values of the second current in the reference period to calculate a result of the add operation as a second suppression current; and
performs a ratio differential relay operation based on the second differential current and the second suppression current,
the current differential relay apparatus, further comprising an output controller which outputs an operation signal for protecting the equipment to be protected, based on a result of operation performed by the first relay and a result of operation performed by the second relay.

2. The current differential relay apparatus according to claim 1, wherein
the output controller outputs the operation signal when at least one of the first relay and the second relay operates.

3. The current differential relay apparatus according to claim 1, wherein
the second relay has a second operational area narrower than a first operational area of the first relay.

4. The current differential relay apparatus according to claim 1, wherein
the first relay calculates the first suppression current and the first differential current, using the first current and the second current which have been through a first filtering process for extracting a fundamental wave component, and
the second relay calculates the second differential current and the second suppression current, using the first current and the second current having through the first filtering process.

5. The current differential relay apparatus according to claim 4, further comprising
a third relay that performs a relay operation using the first current and the second current which have been through a second filtering process for removing a DC component, wherein
the third relay:
performs an add operation of the first current and the second current after the second filtering process, and calculates a maximum of absolute values of results of add operations in the reference period, as a third differential current;
performs an add operation of a maximum of absolute values of the first current after the second filtering process in the reference period and a maximum of absolute values of the second current after the second filtering process in the reference period to calculate a result of the add operation as a third suppression current;

performs a ratio differential relay operation based on the third differential current and the third suppression current,
the current differential relay apparatus, further comprising
a detector that detects a harmonic component superimposed on a current flow through the equipment to be protected, based on the first current and the second current after the second filtering process, wherein
the output controller further outputs the operation signal, based on a result of detection by the detector and a result of operation performed by the third relay.

6. The current differential relay apparatus according to claim 5, further comprising
a signal output unit that outputs a signal indicating an operation of the third relay, based on a result of operation performed by the third relay and a result of detection by the detector, wherein
the signal output unit outputs the signal indicating the operation of the third relay when the harmonic component is not detected and the third relay operates, and
the output controller outputs the operation signal when the signal output unit outputs the signal indicating the operation of the third relay.

7. The current differential relay apparatus according to claim 5, wherein
when the harmonic component is detected, the third relay sets a third operational area of the third relay narrower than a second operational area of the second relay.

8. The current differential relay apparatus according to claim 2, wherein
the second relay has a second operational area narrower than a first operational area of the first relay.

9. The current differential relay apparatus according to claim 2, wherein
the first relay calculates the first suppression current and the first differential current, using the first current and the second current which have been through a first filtering process for extracting a fundamental wave component, and
the second relay calculates the second differential current and the second suppression current, using the first current and the second current which have been through the first filtering process.

10. The current differential relay apparatus according to claim 3, wherein
the first relay calculates the first suppression current and the first differential current, using the first current and the second current which have been through a first filtering process for extracting a fundamental wave component, and
the second relay calculates the second differential current and the second suppression current, using the first current and the second current which have been through the first filtering process.

11. A current differential relay apparatus, comprising a first relay and a third relay that perform a relay operation using a first current on a first side of equipment to be protected and a second current on a second side of the equipment to be protected, wherein
the first relay:
calculates a first differential current and a first suppression current, using the first current and the second current which have been through a first filtering process for extracting a fundamental wave component; and
performs a ratio differential relay operation based on the first differential current and the first suppression current, and the third relay:
performs an add operation of the first current and the second current which have been through a second filtering process for removing a DC component, and calculates a maximum of absolute values of results of add operations in a reference period as a third differential current;

performs an add operation of a maximum of absolute values of the first current after the second filtering process in the reference period and a maximum of absolute values of the second current after the second filtering process in the reference period to calculate a result of the add operation as a third suppression current; and performs a ratio differential relay operation based on the third differential current and the third suppression current, the current differential relay apparatus, further comprising:

a detector that detects a harmonic component superimposed on a current flow through the equipment to be protected, based on the first current and the second current after the second filtering process; and an output controller that outputs an operation signal for protecting the equipment to be protected, based on a result of operation performed by the first relay, a result of detection by the detector, and a result of operation performed by the third relay.

\* \* \* \* \*